United States Patent
Ida et al.

(10) Patent No.: US 10,939,090 B2
(45) Date of Patent: Mar. 2, 2021

(54) CONTROL APPARATUS, IMAGING APPARATUS, ILLUMINATION APPARATUS, IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Yoshiaki Ida, Utsunomiya (JP); Chiaki Inoue, Utsunomiya (JP); Yuichi Kusumi, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/744,392

(22) Filed: Jan. 16, 2020

(65) Prior Publication Data
US 2020/0252598 A1   Aug. 6, 2020

(30) Foreign Application Priority Data

Feb. 6, 2019   (JP) .............................. JP2019-019645
Dec. 27, 2019  (JP) .............................. JP2019-237623

(51) Int. Cl.
*H04N 13/254*   (2018.01)
*H04N 13/296*   (2018.01)

(52) U.S. Cl.
CPC ......... *H04N 13/254* (2018.05); *H04N 13/296* (2018.05)

(58) Field of Classification Search
USPC .......................................................... 348/46
See application file for complete search history.

(56) References Cited

U.S. PATENT DOCUMENTS

| | | | | |
|---|---|---|---|---|
| 2007/0292088 A1* | 12/2007 | Saitoh | ................ | G02B 19/0028 385/115 |
| 2018/0039840 A1* | 2/2018 | Ushirosako | ...... | H04N 21/21805 |
| 2019/0356836 A1* | 11/2019 | Ida | .......................... | G06T 7/586 |
| 2020/0014828 A1* | 1/2020 | Inoue | ................... | G03B 17/565 |

FOREIGN PATENT DOCUMENTS

| | | | | |
|---|---|---|---|---|
| JP | 2018-009858 | * | 1/2018 | ............. G01B 11/26 |
| JP | 2018009858 A | | 1/2018 | |

* cited by examiner

*Primary Examiner* — Behrooz M Senfi
(74) *Attorney, Agent, or Firm* — Rossi, Kimms & McDowell LLP

(57) ABSTRACT

A control apparatus includes a write unit configured to write additional information on an imaging state in acquiring an image captured with at least three light sources located at different positions by correlating the additional information with the image. The additional information is information configured to identify at least one of information on an incident angle of light from each light source toward the object on the image and light amount distribution information of the light emitted from each light source on the image.

20 Claims, 7 Drawing Sheets

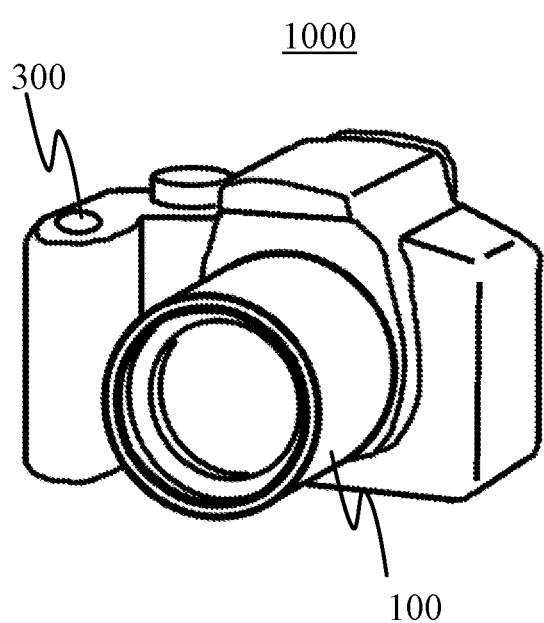
FIG. 1A
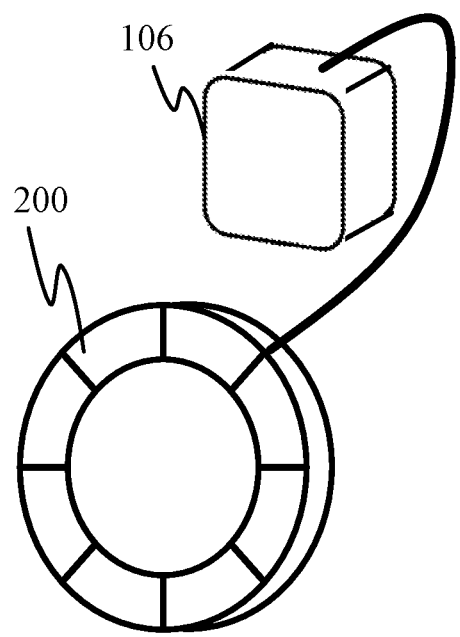
FIG. 1B
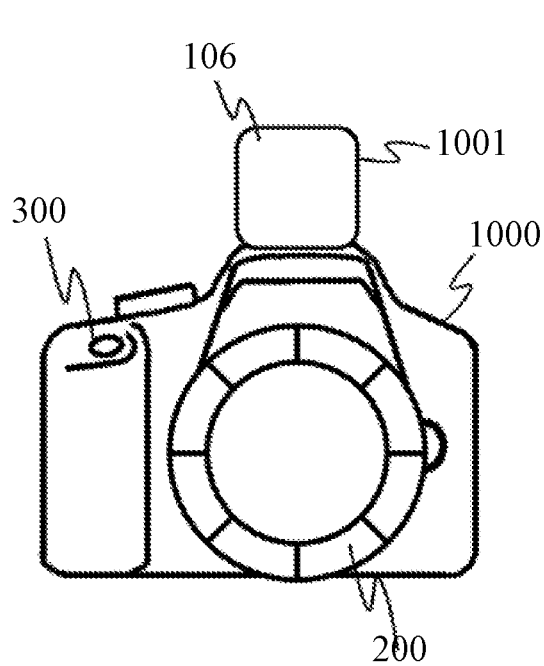
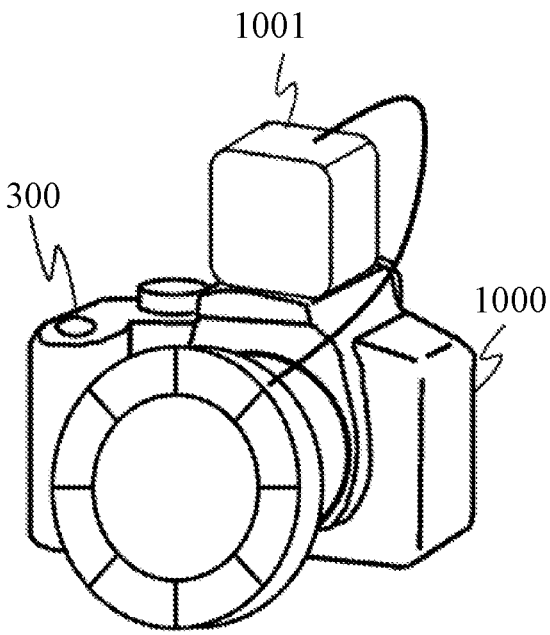
FIG. 2

CONTROL APPARATUS, IMAGING APPARATUS, ILLUMINATION APPARATUS, IMAGE PROCESSING APPARATUS, IMAGE PROCESSING METHOD, AND STORAGE MEDIUM

BACKGROUND OF THE INVENTION

Field of the Invention

The present invention relates to a control apparatus, an imaging apparatus, an illumination apparatus, an image processing apparatus, an image processing method, and a storage medium.

Description of the Related Art

Image processing following imaging can generate an image based on a physical model by acquiring more physical information on an object. For example, an image can be generated that reproduces not only the light amount of the light source but also the perspective (view or appearance) of the object whose position and size of the light source are changed. The perspective of the object is determined by shape information of the object, reflectance information of the object, light source information, and the like. Since a physical behavior of light emitted from the light source and reflected by the object depends on a local surface normal, using the surface normal of the object rather than a three-dimensional shape is especially effective. One conventional method for acquiring the surface normal of the object, for example, is a method of converting a three-dimensional shape obtained from distance information acquired by a method such as the triangulation using the laser beam and the binocular stereo into surface normal information. However, this method complicates the apparatus, and the accuracy of the acquired surface normal is insufficient.

On the other hand, a photometric stereo method is known as a method of directly acquiring the surface normal of the object. The photometric stereo method assumes a reflection characteristic of the object based on the surface normal of the object and the direction from the object to the light source, and calculates the surface normal based on the object luminance information at a plurality of light source positions and the assumed reflection characteristic. The reflection characteristic of the object can be approximated, for example, using the Lambert diffuse reflection model according to the Lambert's cosine law.

The photometric stereo method uses the object luminance change that depends on the light source position, and thus requires the light amount information of the light source. Japanese Patent Laid-Open No. ("JP") 2018-9858 discloses a method for storing information that is made by adding information of the emission amount to image information so that light amount information can be corrected and surface normal calculation processing can be executed later.

The method disclosed in JP 2018-9858 does not add information on the incident angle of light from the light source (light-source incident angle) to the image information, and thus cannot calculate the surface normal by the photometric stereo method unless the light-source incident angle is separately acquired. It is thus necessary to store the light-source incident angle in the imaging apparatus, to require the user to manually input the information of the light-source incident angle recorded in the measurement, and to perform the well-known light source environment estimation processing that estimates the light-source incident angle based on the glossy reflection of the specular sphere, etc. However, the light-source incident angle when it is stored in the imaging apparatus cannot be used, if the image is transmitted to an image processing apparatus provided separately from the imaging apparatus and configured to perform the surface normal calculation processing. In addition, it is arduous for the user to input the light-source incident angle in calculating the surface normal. Moreover, the light source environment estimation processing makes heavier the calculation load and lowers the calculation accuracy of the surface normal due to the estimation error.

The method disclosed in JP 2018-9858 does not correct the uneven light amount in the image, and thus needs to make equal the light amount distributions of the light incident on the object in the imaging area from the light source at different positions. Unless the light source emits ideal parallel light, the diffuse light sources actually disposed at a finite distance from the object have illumination difficulties in equalizing the light amount distributions of the incident light from different positions on the object surface. Since it is also difficult to estimate the light amount distribution of the illumination apparatus during imaging from an image having a variety of objects, the surface normal calculation accuracy lowers due to the influence of the uneven light amount.

SUMMARY OF THE INVENTION

The present invention provides a control apparatus, an imaging apparatus, an illumination apparatus, an image processing apparatus, an image processing method, and a storage medium, each of which can lessen a burden of a user in accurately obtaining surface normal information.

A control apparatus according to one aspect of the present invention includes a write unit configured to write additional information on an imaging state in acquiring an image captured with at least three light sources located at different positions by correlating the additional information with the image. The additional information is information configured to identify at least one of information on an incident angle of light from each light source toward the object on the image and light amount distribution information of the light emitted from each light source on the image, and at least one processor or circuit is configured to perform a function of the write unit.

An illumination apparatus controlled by the above control apparatus according to one aspect of the present invention includes at least three light sources located at different positions, and an identified portion configured to cause the control apparatus to identify information on the illumination apparatus. An imaging apparatus having the above control apparatus also constitutes another aspect of the present invention.

An image processing apparatus according to another aspect of the present invention includes an image acquisition unit configured to acquire an image, an additional information acquisition unit configured to acquire additional information on an imaging state in acquiring the image, and a surface normal information acquisition unit configured to acquire surface normal information based on information on an incident angle of light from the light source to the object on the image, and light amount distribution information emitted from the light source on the image, acquired with the additional information. An image projecting method corresponding to the image processing apparatus and a storage medium storing a program corresponding to the image projecting method also constitute another aspect of the present invention.

Further features of the present invention will become apparent from the following description of exemplary embodiments with reference to the attached drawings.

BRIEF DESCRIPTION OF THE DRAWINGS

FIG. 1A is an overview of an imaging apparatus according to a first embodiment.

FIG. 1B is an overview of an illumination apparatus according to the first embodiment.

FIG. 2 is an overview of the imaging apparatus mounted with the illumination apparatus according to the first embodiment.

DESCRIPTION OF THE EMBODIMENTS

Figure 3:
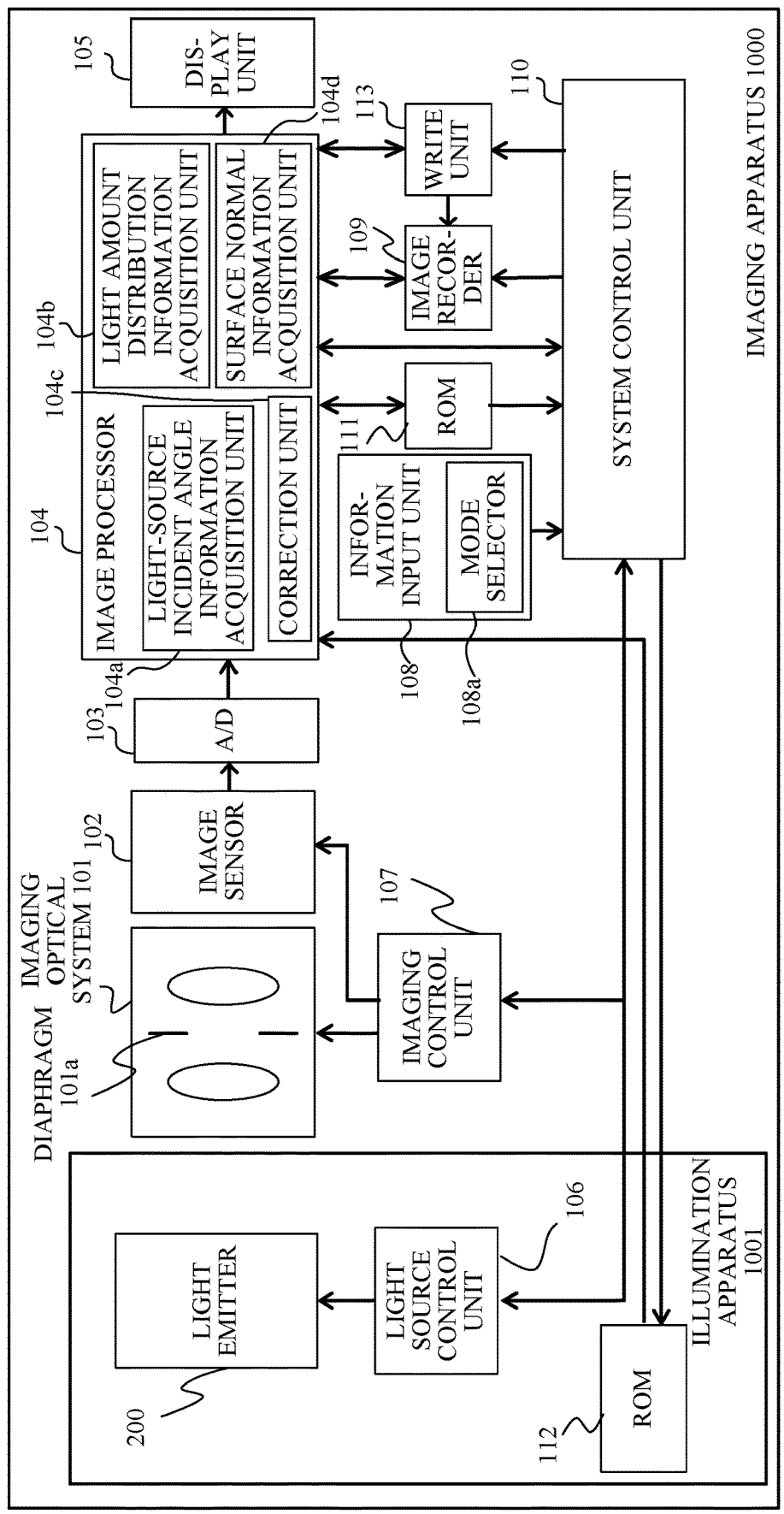
FIG. 3 is a block diagram of the imaging apparatus according to the first embodiment.

Referring now to the accompanying drawings, a detailed description will be given of embodiments according to the present invention. Corresponding elements in respective figures will be designated by the same reference numerals, and a duplicate description thereof will be omitted.

Description of Photometric Stereo Method

Figure 9:
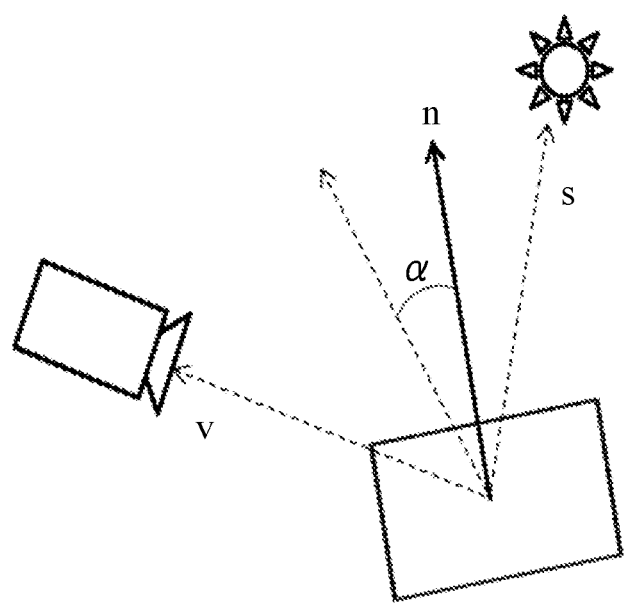
FIG. 9 is a schematic diagram for explaining a specular reflection component.

The photometric stereo method is a method that assumes the reflection characteristic of the object based on the surface normal of the object and the direction (light source direction) from the object to the light source, and calculates the surface normal information based on the reflection characteristic assumed as the object luminance information at a plurality of light source positions. When the reflectance cannot be uniquely determined with a predetermined surface normal and the light source position, the reflection characteristic may be approximated by the Lambert reflection model according to the Lambert's cosine law. As illustrated in FIG. 9, the specular reflection component depends on an angle α between a bisector of the light source vector s and the visual line direction vector v, and the surface normal n. Thus, the reflection characteristic may be based on the visual line direction. The luminance information may be obtained by capturing objects where the light source is turned on and where it is turned off, and by calculating a difference between them so as to remove the influence of the non-light source such as ambient light.

A description will now be given of the reflection characteristic assumed in the Lambert reflection model. Where i is a luminance value of the reflected light, $\rho_d$ is a Lambert diffuse reflectance of the object, E is an intensity of the incident light, s is a unit vector (light source vector) indicating the direction from the object to the light source, and n is a unit surface normal vector of the object, then the luminance value i is expressed by the following expression (1) from the Lambert's cosine law.

$$i = E\rho_d s \cdot n \quad (1)$$

Where $s_1, s_2, \ldots, s_M$ are components of M (M≥3) different light source vectors and $i_1, i_2, \ldots, i_M$ are luminance values of the components for each light source vector, the expression (1) is expressed by the following expression (2).

$$\begin{bmatrix} i_1 \\ \vdots \\ i_M \end{bmatrix} = \begin{bmatrix} s_1^T \\ \vdots \\ s_M^T \end{bmatrix} E\rho_d n \quad (2)$$

In the expression (2), the left side is a luminance vector of M rows and 1 column, the right side $[s_1^T, \ldots s_M^T]$ is an incident light matrix S indicating the light source direction of M rows and 3 columns, n is a unit surface normal vector of 3 rows and 1 column. In the case of M=3, $E\rho_d n$ is expressed by the following expression (3) using an inverse matrix $S^{-1}$ of the incident light matrix S.

$$E\rho_d n = S^{-1} \begin{bmatrix} i_1 \\ \vdots \\ i_M \end{bmatrix} \quad (3)$$

A norm of the vector on the left side of the expression (3) is a product of the intensity E of the incident light and the Lambert diffuse reflectance $\rho_d$, and the normalized vector is calculated as the surface normal vector of the object. In other words, since the intensity E of the incident light and the Lambert diffuse reflectance $\rho_d$ appear in the conditional expression only in the form of the product and thus, where $E\rho_d$ is considered to be one variable, the expression (3) can be regarded as a simultaneous expression that determines three unknown variables including two degrees of freedom of the unit surface normal vector n. Therefore, acquiring the luminance information using at least three light sources can determine each variable. When the incident light matrix S is an irregular matrix, there is no inverse matrix and it is thus necessary to select each component $s_1$ to $s_3$ in the incident light matrix S so that the incident light matrix S can be a regular matrix. In other words, the component $s_3$ may be selected linearly and independently of the components $s_1$ and $s_2$.

In the case of M>3, there are conditional expressions more than the number of unknown variables to be calculated. Therefore, the unit surface normal vector n may be calculated from three arbitrarily selected conditional expressions by the same method as that with M=3. When four or more conditional expressions are used, the incident light matrix S does not become a regular matrix and, for example, an approximate solution may be calculated using a Moore-Penrose pseudo inverse matrix. The unit surface normal vector n may also be calculated by a fitting method or optimization method.

When the reflection characteristic of the object is assumed by a model different from the Lambert reflection model, the conditional expression may be different from the linear equation for each component in the unit surface normal vector n. In this case, the fitting method and optimization method can be used once conditional expressions more than the number of unknown variables are obtained.

In case of M>3, a plurality of (from 3 to M−1 inclusive) conditional expressions can be obtained and a plurality of solution candidates of the unit surface normal vector n can be calculated. In this case, a solution may be selected from the plurality of solution candidates using still another condition. For example, the continuity of the unit surface normal vector n can be used as a condition. Where the unit surface normal n is calculated for each pixel of the imaging apparatus and n(x−1, y) is known with the surface normal at pixel (x, y) being n(x, y), a solution that minimizes the evaluation function expressed by the following expression (4) may be selected.

$$1-n(x, y) \cdot n(x-1, y) \quad (4)$$

If n(x+1, y) and n(x, y±1) are also known, the solution that minimizes the following term (5) may be selected.

$$4-n(x, y) \cdot n(x-1, y)-n(x, y) \cdot n(x+1, y)-n(x, y) \cdot n(x, y-1)-n(x, y) \cdot n(x, y+1) \quad (5)$$

Where there is no known surface normal and there is ambiguity of the surface normal at all pixel positions, the solution may be selected so that the sum total of all pixels of the term (5) becomes minimum, as illustrated in the following expression (6).

$$\sum_{x,y} \{4 - n(x, y) \cdot n(x-1, y) - n(x, y) \cdot n(x+1, y) - n(x, y) \cdot n(x, y-1) - n(x, y) \cdot n(x, y+1)\} \quad (6)$$

A surface normal at a non-closest pixel or an evaluation function weighted according to a distance from an addressed pixel position may also be used.

The luminance information at an arbitrary light source position may be used for another condition. In the diffuse reflection model represented by the Lambert reflection model, the closer the unit surface normal vector and the light source direction vector are, the higher the luminance of the reflected light becomes. Thus, the unit surface normal vector can be determined by selecting a solution close to the light source direction vector in which the luminance value becomes the largest among the luminance values in the plurality of light source directions.

In the specular reflection model, the following expression (7) is established where s is the light source vector and v is the unit vector in the direction from the object to the camera (visual line vector of the camera).

$$s+v=2(v \cdot n)n \quad (7)$$

As expressed by the expression (7), if the light source direction vector s of the camera and the visual line vector v are known, the unit surface normal vector n can be calculated. With the surface roughness, the specular reflection also has a spreading exit angle. However, the angle spreads near the solution obtained as a smooth surface, and it is thus sufficient to select a candidate that is the closest to the solution to the smooth surface among the plurality of solution candidates. Alternatively, a true solution may be determined by averaging the plurality of solution candidates.

Light-Source Incident Angle that is Problem of the Invention

As can be seen from the expression (3), the photometric stereo method estimates the surface normal information using the light source vector s. If the uncalibrated photometric stereo method that makes unknown the light source vector or the method that estimates the light source environment from the image is used to obtain the equivalent surface normal acquisition accuracy, the number of images to be captured and the number of light emitters increase or the calculation load becomes heavier. Once the light source direction is known in advance, the surface normal information acquisition accuracy is better than that these methods for estimating the light source from an unknown state.

Uneven Illuminance that is Problem of the Invention

As can be seen from the expression (1), in the photometric stereo method, the intensity E of the incident light affects the estimation result of the surface normal information. In a series of captured images taken at a plurality of light source positions, when the luminance change at a predetermined pixel is addressed and the light amount for each light source scatters from the assumed value, the normal surface is estimated so that the luminance value i on the left side scatters. The light amount also scatters due to the scattering of the emitted light amount for each light source, but also due to the uneven illuminance when the light from the light source enters the object surface. In particular, it is difficult to make a design and control so as to equalize the uneven illuminances when the light sources at different positions irradiate light on the object surface in a general imaging apparatus with a flexible imaging distance, and thus the luminance value of the obtained image needs to be corrected.

First Embodiment

FIGS. 1A and 1B are overviews of a digital camera that is an illustrative imaging apparatus 1000 according to this embodiment and an illumination apparatus 1001. A release button 300 is a button for making imaging and autofocus. The illumination apparatus 1001 includes a light emitter 200 and a light source control unit 106, and is detachably attached to the imaging apparatus 1000. If lighting or acquisition of surface normal information by the illumination apparatus 1001 are unnecessary, only the imaging apparatus 1000 may be used. The illumination apparatus 1001 attachable to and detachable from the imaging apparatus 1000 enables an appropriate combination of the illumination apparatus 1001 and the imaging apparatus 1000 to be selected and used according to the scene such as the material and size of the object, the object distance, and the intensity of ambient light.

In this embodiment, the light emitter 200 is attached to the imaging apparatus 1000 rotatably around an optical axis of an imaging optical system 101 to be described later, and includes eight light sources arranged concentrically and rotationally symmetrically around the optical axis. Since at least three light sources are necessary for the photometric stereo method, the light emitter 200 may include three or more light sources. In this embodiment, the light emitter 200 is configured such that a plurality of light sources are arranged concentrically and rotationally symmetrically around the optical axis of the imaging optical system 101, but the light sources are not necessarily arranged at regular intervals and may be spaced at irregular intervals. The light sources do not have to be integrated with each other, and each light source may be separated from each other. In this embodiment, the light emitter 200 is detachably attached to the imaging apparatus 1000, but may be built in the imaging apparatus 1000.

The light source control unit 106 controls the (light) emission state of the light source according to an instruction output from the system control unit 110 described later. The emission state is a state relating to the light emission that affects a captured image such as a (light) emission amount, a position, a direction relative to an object, a light intensity distribution from a light source, and the like. This embodiment builds the light source control unit 106 in the illumination apparatus 1001, but may build it in the imaging apparatus 1000 or an external device different from the illumination apparatus 1001 or the imaging apparatus 1000.

The illumination apparatus 1001 may include an identified portion that causes the system control unit 110 to identify the illumination apparatus 1001. The identified portion may be a ROM 112 that stores information for transmitting information that can identify the illumination apparatus 1001 to the system control unit 110, which will be described later, or a contact portion with the imaging apparatus 1000 that generates a unique voltage value when the illumination apparatus 1001 is attached to the imaging apparatus 1000.

FIG. 2 is an overview of the imaging apparatus 1000 mounted with the illumination apparatus 1001. FIG. 3 is a block diagram of the imaging apparatus 1000.

The imaging optical system 101 includes a diaphragm 101a and forms an image of light emitted from an object on an image sensor 102. In this embodiment, the imaging optical system 101 is detachably attached to the imaging apparatus 1000, but may be built in the imaging apparatus 1000.

The image sensor 102 includes a photoelectric conversion element such as a CCD sensor and a CMOS sensor, captures an object, and acquires an image. An analog electric signal generated by the photoelectric conversion of the image sensor 102 is converted into a digital signal (captured image, luminance information) by an A/D converter 103, and input to an image processor 104.

The image processor 104 acquires the surface normal information of the object together with image processing (development processing, various image correction processing, etc.) generally performed for the digital signal. The surface normal information includes information for determining at least one candidate of one freedom degree of the surface normal, information for selecting a true solution from among a plurality of surface normal solution candidates, and information on the validity of the calculated surface normal. The image processor 104 includes a light-source incident angle information acquisition unit 104a that acquires the incident angle of light from the light emitter 200 to the object, and a light amount distribution information acquisition unit 104b that acquires light amount distribution information of light from the light emitter 200. The light amount distribution information is information on the light amount distribution of the light from the light emitter 200 on the image to be processed. The image processor 104 further includes a correction unit 104c that corrects a luminance value of an image captured based on the light amount distribution information for each area, and a surface normal information acquisition unit 104d that acquires surface normal information. The captured image processed by the image processor 104 is stored in an image recorder 109 such as a semiconductor memory and an optical disc. The output image may be displayed on a display unit 105. In this embodiment, the light-source incident angle information acquisition unit 104a, the light amount distribution information acquisition unit 104b, the correction unit 104c, and the surface normal information acquisition unit 104d are built in the imaging apparatus 1000, but as described later they may be configured separate from the imaging apparatus 1000.

A write unit 113 writes additional information on an imaging state in acquiring an image captured with at least three light sources located at different positions by correlating the additional information with the image. The additional information is information configured to identify at least one of information on an incident angle of light from each light source toward the object on the image and light amount distribution information of the light emitted from each light source on the image.

More specifically, the write unit 113 records additional information on the imaging state in the image recorder 109 by correlating the additional information with the image obtained from the image processor 104, which is used to acquire information on the incident angle of light (light-source incident angle) from the light source to the object on the image and light amount distribution information on the image. The imaging state includes settings during imaging such as the zoom magnification, the F-number, and the focus position of the imaging optical system 101, the specification of the imaging apparatus 1000, and the emission state of the light source. The additional information is saved as metadata other than the image itself, such as EXIF (exchangeable image file format). Information on the light-source incident angle and light amount distribution information on the image can be acquired by passing information from the ROM 112 and the light source control unit 106 via the system control unit 110 and the image processor 104. This embodiment stores the light amount distribution information in the ROM 112, but may store it in a ROM 111. In this case, the write unit 113 acquires the light amount distribution information based on information configured to identify the illumination apparatus 1001 acquired by the system control unit 110.

The write unit 113 may change the additional information to be recorded, according to the imaging state that affects the light-source incident angle and the light amount distribution such as the zoom magnification and imaging distance during imaging. In this case, the write unit 113 acquires the additional information that has been changed by the image processor 104 based on the imaging information acquired via the system control unit 110.

The write unit 113 may change the additional information based on a plurality of (light) emission modes. Thereby, this embodiment can separately handle a case of acquiring the surface normal information, a case of imaging using lighting without acquiring the surface normal information, and a case of imaging without non-emissions. Thus, when the surface normal information is not acquired, a series of images for reducing the data amount and for acquiring the surface normal information can be distinguished from other images without saving the additional information used only to acquire the surface normal information.

The additional information may include at least one of the imaging condition, the trimming information, and the sensor size. When imaging is performed by changing the zoom magnification or the imaging distance, the angle of view and the magnification to be captured change and thus, in order to obtain the light-source incident angle corresponding to the position in the image and the light amount distribution in the image generated by the light intensity distribution of the light emitter 200, information on the imaging condition is necessary. It is therefore necessary to record the condition of the imaging optical system 101 as the additional information together with the condition of the illumination apparatus 1001. The imaging distance information is necessary to obtain the light-source incident angle and the light amount distribution in the image from the position and orientation of the light source. Similarly, when the captured image is acquired by trimming (cropping), the angle of view and the magnification to be captured change, so that the trimming information is necessary to obtain the light-source incident angle and the light intensity distribution in the image. It is thus necessary to record the image acquisition conditions of the imaging apparatus 1000 as the additional information together with the condition of the illumination apparatus 1001. The angle of view and the magnification to be imaged change depending on the size (sensor size) of the image sensor 102. This is necessary to obtain the light-source incident angle and the light amount distribution in the image in a variable combination, for example, where the illumination apparatus 1001 and the imaging apparatus 1000 are detachable and exchangeable.

An information input unit 108 supplies the imaging condition (F-number (aperture value), exposure time, focal length, etc.) selected by the user to the system control unit 110. A mode selector 108a supplies the system control unit 110 with an imaging (light emission) mode (full emission mode, programmed emission mode, non-emission mode, another emission mode, etc.) selected by the user. In this embodiment, the mode selector 108a is built in the imaging apparatus 1000, but may be built in the illumination apparatus 1001, and the imaging mode may be supplied to the light source control unit 106.

The programmed emission mode is a mode in which the emission state is changed in synchronization with each of at least three imaging signals. In this mode, the user can capture images with different lighting conditions in synchronization with continuous imaging without the user controlling the emission state for each imaging, and easily obtain the images required for the photometric stereo method. The photometric stereo method may be performed using at least some of the plurality of captured images. In addition, a weighted average of a plurality of captured images can be taken, and the light amount and light amount ratio of the plurality of lighting conditions can be changed later.

The programmed emission mode may have a plurality of modes, for example, different modes in light emitting order, the number of light sources that simultaneously emit light, the number of emission states, and the like. A different programmed emission modes may be automatically selected according to the imaging condition such as the distance to the object and shutter speed, or a specific programmed emission mode may be selected by the user designation. For example, it is possible to change the number of emission states for a smaller number of image captures, or to change the number of light sources used in a single emission state to adjust the light amount. In the programmed emission mode, the number of emission states may be automatically linked to the number of images acquired during imaging. When continuous imaging is interrupted, the emission state may be resumed from the next emission state, or imaging may be started from the first emission state.

At least one of the plurality of emission states in the programmed emission mode may be a state that emits none of the light sources (non-emission state). With the non-emission state, the influence of the ambient light can be subtracted by calculating the difference from the emission state. Thereby, the captured image based only on the incident light from the light emitter 200 required for the photometric stereo method can be acquired, and the error caused by the influence of the ambient light can be reduced.

The additional information may include identification information of the illumination apparatus 1001 in the programmed emission mode. The identifiable illumination apparatus 1001 makes available the information on the emission state such as the emission amount, the position of the light source, the light intensity distribution, and the emission area. When there are a plurality of illumination apparatuses 1001, each identification information may be included. The identification information may include model name information and individual identification information. In specifying an individual, a manufacturing error may be considered advantageously.

The additional information may include position information of the light source for the imaging apparatus 1000 in the programmed emission mode. Based on the position and orientation of the light source relative to the imaging apparatus 1000, the light-source incident angle and light intensity distribution in the relative positional relationship between the imaging apparatus 1000 and the object in combination with the position and light intensity distribution of the light source, and the light intensity distribution in the image etc. can be obtained. The position information does not have to be a coordinate as long as the position information can be specified. For example, the position information may be an identification number of the illumination apparatus 1001 and a light source number assigned to the light source. This embodiment arranges the light sources rotationally symmetrically and concentrically around the optical axis of the imaging optical system 101 as the center, and therefore it is expressed in such a form as a distance from the optical axis.

The additional information may include information for identifying the emission state of each light source in the programmed emission mode. Using the information on the light emission condition, such as the emission amount and position of each light source, the intensity distribution and the emission area of the emitted light, the information on the light-source incident angle and light intensity distribution information on the image can be obtained for each image position of the object, and the light amount and the light-source incident angle required for the illuminance stereo method can be acquired.

The full emission mode (all-emission mode) is a mode that emits all light sources, and the non-emission mode is a mode that emits none of the light sources. The full emission mode can make larger an emission amount, and the normal lighting photography can make the best use of the light amount and the light emission area of the illumination apparatus 1001. The non-emission mode can capture an image in a scene that does not require additional lighting.

An imaging control unit 107 acquires an image under a desired imaging condition selected by the user based on information output from the system control unit 110.

The ROM 111 stores a variety of programs executed by the system control unit 110 and data necessary for the programs.

Figure 4:
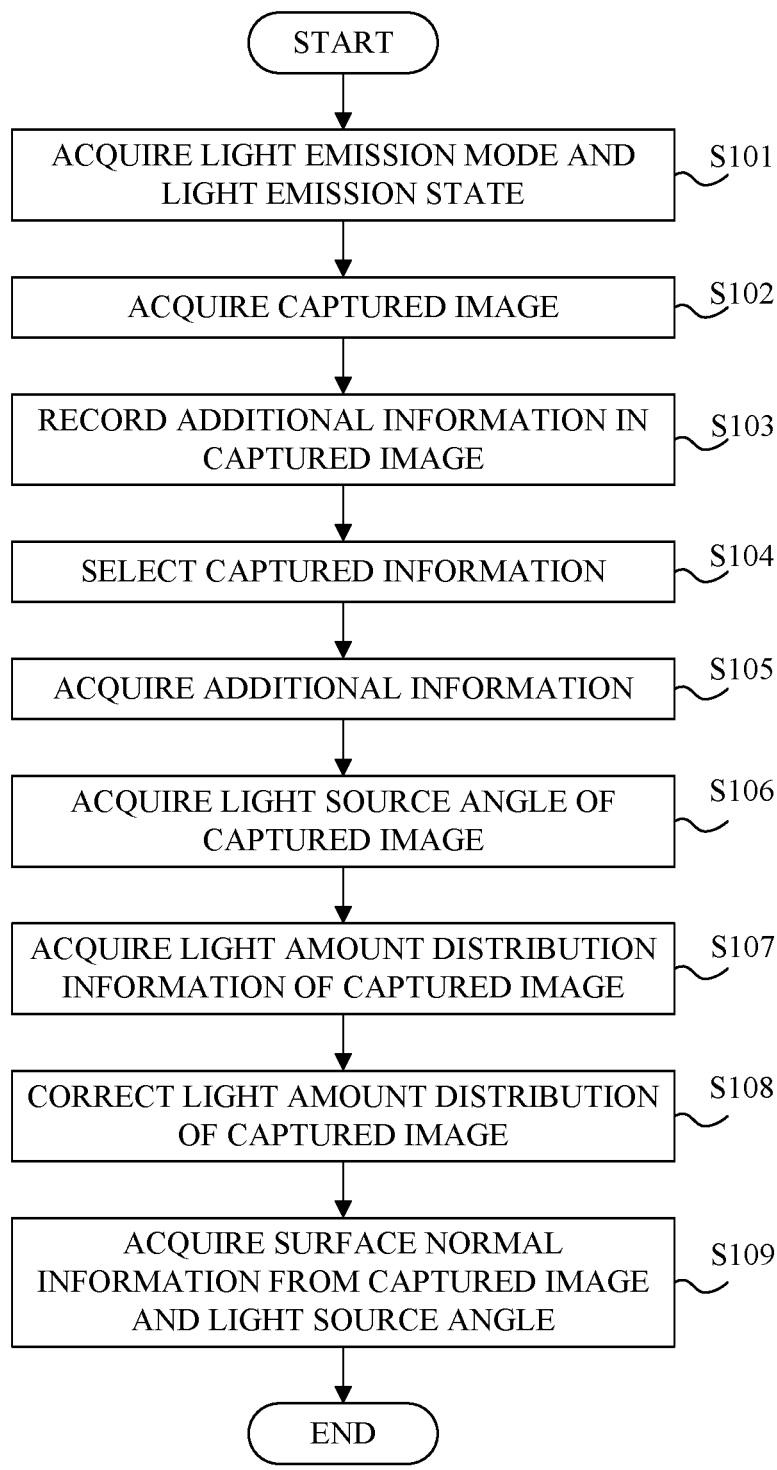
FIG. 4 is a flowchart illustrating surface normal information acquisition processing according to the first embodiment.

FIG. 4 is a flowchart illustrating the surface normal information acquisition processing according to this embodiment. The surface normal information acquisition processing according to this embodiment is executed according to the program by the control unit constituted by the system control unit 110 and the write unit 113 and the image processor 104. The program may be recorded on a computer-readable storage medium, for example.

In the step S101, the system control unit 110 acquires the emission mode from the mode selector 108a, and the emission state of the light source from the light source control unit 106.

In the step S102, the system control unit 110 first acquires the imaging condition set by the user through the information input unit 108. Next, the system control unit 110 obtains a captured image by capturing the object using the imaging condition and the emission mode and emission state acquired in the step S101 in response to the full pressing operation of the release button 300. In the full emission mode, all the light sources simultaneously emit light to capture an image, and in the non-emission mode, the image is taken by emitting none of the light sources. However, in acquiring the surface normal information, an object is imaged at a plurality of light source positions while the emission state is changed in a predetermined order in the programmed emission mode in synchronization with the imaging signal. At this time, an imaging signal may be sent in accordance with a user's release instruction, or may be automatically sent in accordance with the number of emission states set in the programmed emission mode. For example, the system control unit 110 sequentially irradiates the object with light from eight light sources via the light source control unit 106, and then causes an imaging unit 100 to capture the image via the imaging control unit 107, including the non-emission state. The emission state in the programmed emission mode may use at least three light sources located at different positions.

Figure 5:
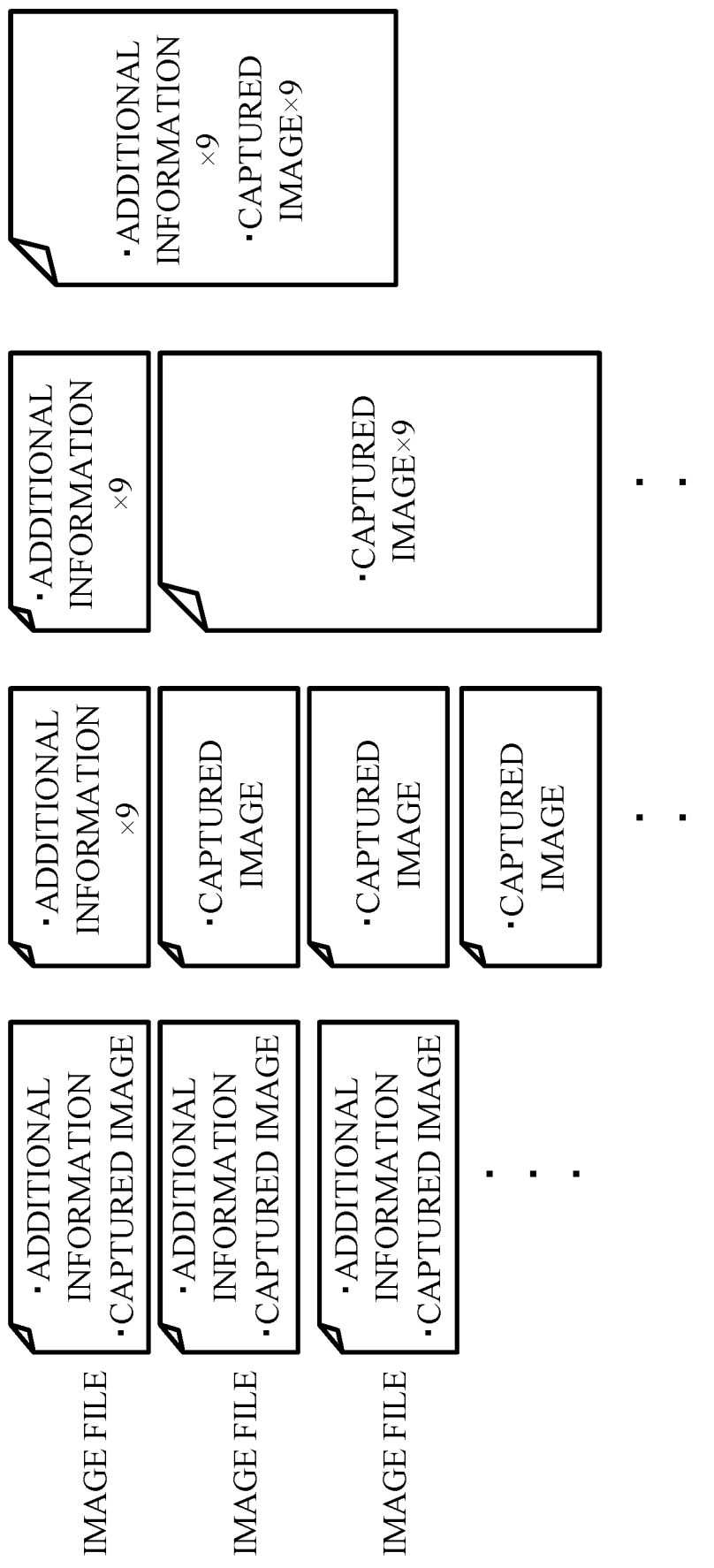
FIGS. 5A to 5D illustrate an illustrative recording method of a captured image and additional information.

In the step S103, the write unit 113 first obtains the imaging condition as additional information such as information that can identify the illumination apparatus 1001, information that specifies the position of the emitting light source, the zoom magnification, the object distance, and the sensor size. The information for specifying the position of the emitting light source may be the identification number of the light emitter 200 and the rotation angle of the illumination apparatus 1001 relative to the imaging apparatus 1000. Next, the write unit 113 records the additional information in the image recorder 109 in association with the captured image acquired from the image processor 104. More specifically, as illustrated in FIG. 5A, the write unit 113 writes the additional information as header information of each captured image. Thereby, the emission state of each captured image becomes available from the image file. The write unit 113 may write the additional information as footer information of each captured image, for example, and the writing format is not limited.

The write unit 113 records the additional information (such as different identification number) according to the emission mode in the image recorder 109 even in the same emission state. In other words, the additional information for an image captured in a predetermined emission state in the first emission mode is different from the additional information an image captured in a predetermined emission state in the second emission mode. Thereby, in obtaining the surface normal information, for example, it is possible to discriminate between a captured image captured in a non-emission state in the non-emission mode and a captured image captured in a non-emission state in the programmed emitting mode. Therefore, it is possible to determine a captured image used as the input information in acquiring the surface normal information.

The input image for the photometric stereo method or the image composition may be selected from among a series of captured images captured in the programmed emission mode in order to suppress the influence of the position and setting of the image capturing apparatus 1000 and object blurring. Although it seems that the emission state and the additional information may have a one-to-one correspondence, it is possible to reduce the load in selecting the input image by recording different additional information even in a captured image captured in the same emission state.

For example, in imaging with a similar composition or a similar imaging condition, or in reimaging with a slight change in ambient light such as the movement of the sun, the captured images are similar. It is thus difficult to determine and select a series of images from a plurality of images with the same emission state. This becomes more difficult when the photometric stereo method and the image combination processing are performed at a timing different from that of imaging, when it is made by a different user, or when it is performed by an image processing apparatus different from the imaging apparatus 1000. By recording different additional information even in the same emission state, a warning can be issued when the user selects an inappropriate combination of input images, and the input image can be automatically selected. Further, since use of the photometric stereo method can be distinguished from other cases, a data amount of the additional information can be reduced that is used only to obtain the surface normal information.

As illustrated in FIG. 5B, the write unit 113 collects additional information based on a series of captured images as a single file, separately from the captured images recorded one by one when they are captured in the programmed emission mode. In the additional information, information specifying the corresponding captured image needs to be recorded. In this recording method, a series of captured images and the additional information can be acquired by specifying an additional information file. Although the method is similar to the method of FIG. 5A, it is the same as the case where the recording method of the image file is not the programmed emission mode and thus can be handled by the same reading method and UI. On the other hand, since the additional information is a file separate from the image file, it is necessary to acquire each file when the photometric stereo method is executed with the additional information.

As illustrated in FIG. 5C, the write unit 113 may record a series of additional information and a series of captured images together as a single file when the images are captured in the programmed emission mode.

As illustrated in FIG. 5D, the write unit 113 may record all of the series of additional information and the captured images as a single file when the images are captured in the programmed emission mode.

In the recording method illustrated in FIGS. 5C and 5D, since a plurality of image files are recorded together, a series of captured images can be managed collectively.

In the step S104, the system control unit 110 selects captured images acquired in a plurality of emission states for acquiring the surface normal information based on the user designation. As will be described later, since the information of the light-source incident angle and the light amount distribution necessary for the photometric stereo method is acquired from the additional information, the step S104 need not be performed after the step S103.

In the step S105, the image processor 104 acquires the imaging condition as the additional information such as information for identifying the illumination apparatus 1001, information for specifying the emitting light source, the zoom magnification, the object distance, and the sensor size.

In the step S106, the light-source incident angle information acquisition unit 104a acquires the light-source incident angle used to acquire the surface normal information in each area of the captured image using the additional information acquired in the step S105. The light-source incident angle information acquisition unit 104a calculates the light-source incident angle using the object distance, the imaging field angle such as the zoom magnification and the sensor size, and the position of the light emitter 200 relative to the object. In this embodiment, the light-source incident angle information acquisition unit 104a acquires the position of the light source relative to the object using the model type of the illumination apparatus 1001 that can be identified from the additional information and the position of the light source. The step S106 may be executed after the step S107 or S108 described later.

In the step S107, the light amount distribution information acquisition unit 104b acquires the light amount distribution information used to acquire the surface normal information in each area of the captured image using the additional information acquired in the step S105. The light amount distribution information acquisition unit 104b acquires the light amount distribution information on the program using the model type of the illumination apparatus 1001 that can be identified from the additional information and the information of the light emitter 200. The light amount distribution information acquisition unit 104b may read a value from the light amount distribution information stored as a table. The light amount distribution information may be a function or its parameter, a light intensity distribution relative to an emission angle from the light emitter 200, or a light amount distribution on the captured image.

In the step S108, the correction unit 104c corrects the luminance of the captured image using the light amount distribution information acquired in the step S107 so as to reduce the difference in the light amount distribution of the plurality of light sources from the luminance distribution of the captured images acquired in different emission states. For example, the correction unit 104c corrects the luminance of the captured image by multiplying the captured image by the reciprocal of the light amount distribution on the captured image. In the photometric stereo method, the scattering light amount incident on the same object position at different light-source incident angles may degrade the accuracy of the surface normal information to be acquired. Accordingly, by considering the difference in the light amount distribution is considered in acquiring the surface normal information, it is possible to acquire the surface normal information in which the difference in the light amount distribution of the light source is substantially reduced. It is only necessary to correct the influence on the luminance value due to the difference in the light amount distribution between the captured images, and it is not always necessary to correct the influence of the light amount distribution for each image. In addition, an image reflecting only the light from the illumination apparatus 1001 and a well-corrected captured image can be acquired by subtracting the captured image in the non-emission state from another image before the correction, and by eliminating the influence of the ambient light.

In the step S109, the surface normal information acquisition unit 104d acquires the surface normal information by the photometric stereo method using the captured image corrected in the step S108 and the light-source incident angle acquired in the step S106. The surface normal information and the image information are stored in the image recorder 109, and the flow ends.

While this embodiment acquires the captured image corrected in the step S108, the surface normal information may be obtained by considering the light amount distribution when the expression (1) is solved by the photometric stereo method without correcting the captured image. More specifically, it is possible to multiply each light source vector $s_i^T$ by a coefficient so as to convert the intensity E of the incident light in the expression (2) into a form in which the difference in the light amount distribution of each light source is considered. The equation may be solved by reflecting the difference in the light amount for each position of the image and for each light-source incident direction.

This embodiment corrects the luminance of the captured image using the light amount distribution, but may correct the scattering in the irradiation light amount of each light source. The additional information may include the information on the light-source incident angle and the light amount distribution. The ROM 112 may store a table that records the information on the light-source incident angles and light amount distribution for each imaging distance. In this case, the write unit 113 may acquire these pieces of information as the additional information directly from the ROM 112 in the step S103. While this embodiment has discussed the surface normal information acquired in the programmed emission mode, the flow subsequent to the step S104 is unnecessary unless the surface normal information is acquired.

As described above, information on the light-source incident angle and the light amount distribution can be acquired from the additional information by recording the additional information in the captured image. Thereby, the burden of the user can be lessened in calculating the surface normal information with high accuracy.

Second Embodiment

The first embodiment calculates the surface normal information of the object in the imaging apparatus 1000, but this embodiment acquires the surface normal information of the object using an image processing apparatus 2000 different from the imaging apparatus 1000. The image processing apparatus 2000 different from the imaging apparatus 1000 can provide the surface normal information more quickly than the imaging apparatus 1000 or make available a more accurate acquisition method with a heavier load. The surface normal information acquisition and the subsequent image processing can be more conveniently performed as a series of operations, such as rendering an image in which the light source is virtually changed based on the surface normal information. In order to realize this, the image processing apparatus 2000 acquires the additional information, the information on the light-source incident angle and the light amount distribution using the additional information, and the surface normal information. The image processing apparatus 2000 is, for example, a PC or a server.

Figure 6:
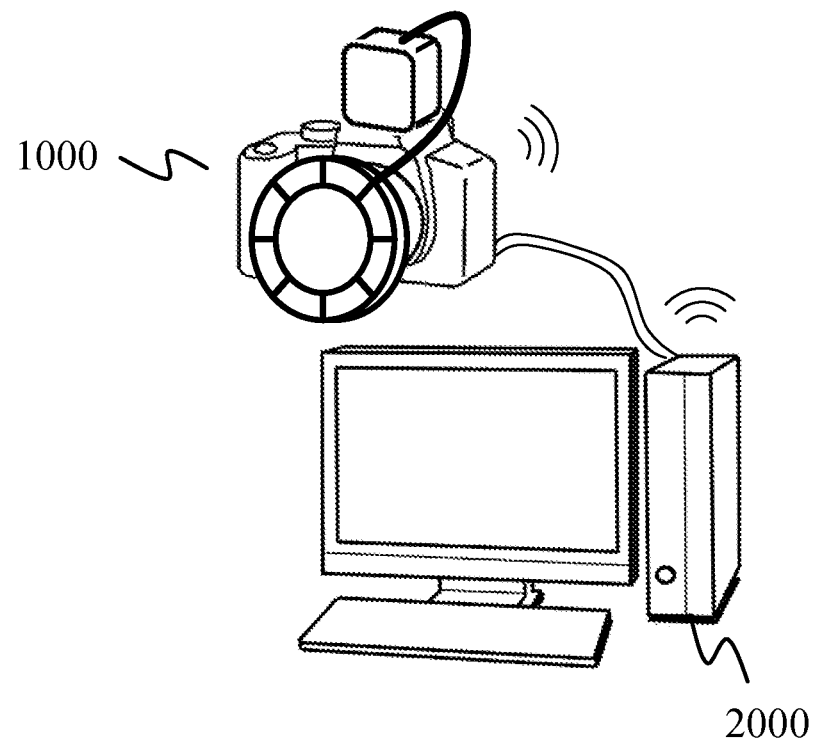
FIG. 6 is an overview of an image processing apparatus according to a second embodiment.
Figure 7:
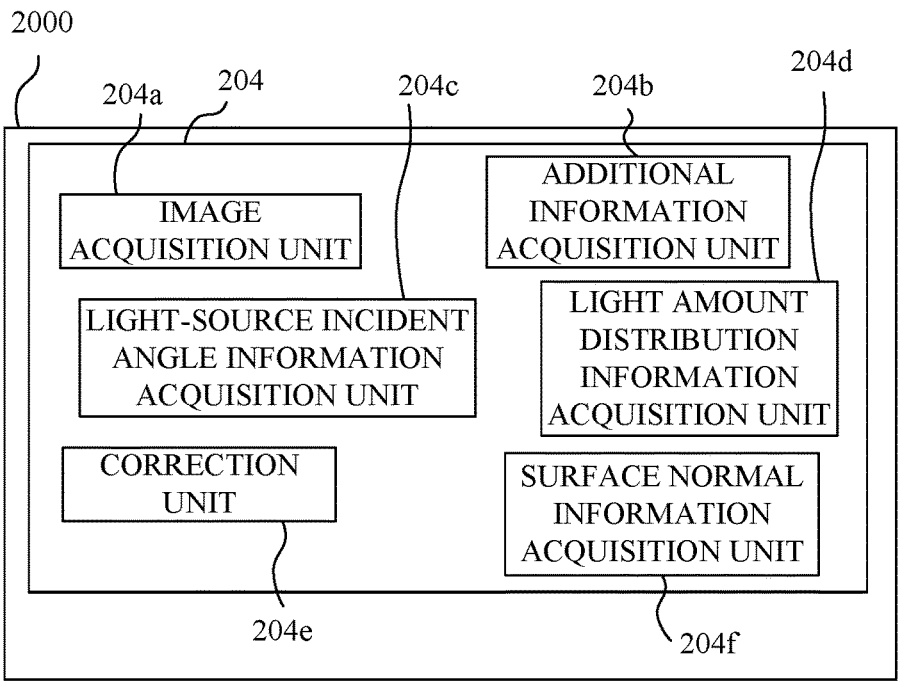
FIG. 7 is a block diagram of an image processing apparatus according to the second embodiment.

FIG. 6 is an overview of a PC that is an illustrative image processing apparatus 2000. FIG. 7 is a block diagram of the image processing apparatus 2000. The image processing apparatus 2000 is connected to the imaging apparatus 1000 by wire or wirelessly, and can receive an image acquired by the imaging apparatus 1000 and additional information.

The image processing apparatus 2000 includes an image acquisition unit 204a, an additional information acquisition unit 204b, a light-source incident angle information acquisition unit 204c, a light amount distribution information acquisition unit 204d, a correction unit 204e, and a surface normal information acquisition unit 204f. The light-source incident angle information acquisition unit 204c, the light amount distribution information acquisition unit 204d, the correction unit 204e, and the surface normal information acquisition unit 204f correspond to the light-source incident angle information acquisition unit 104a, the light amount distribution information acquisition unit 104b, and the correction unit 104c, and the of the first embodiment, respectively.

Figure 8:
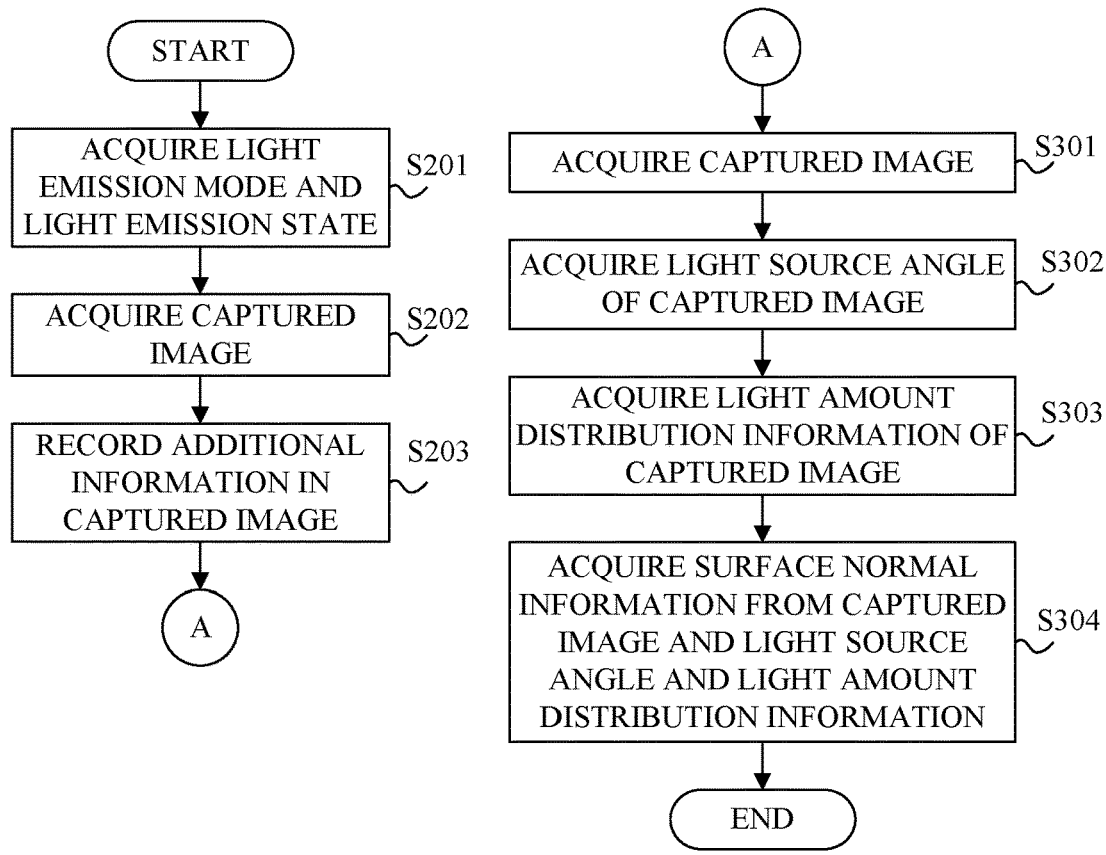
FIG. 8 is a flowchart illustrating surface normal information acquisition processing according to the second embodiment.

FIG. 8 is a flowchart illustrating surface normal information acquisition processing according to this embodiment.

The steps S201 to S203 are performed by the imaging apparatus 1000 and are similar to the steps S101 to S103.

The steps S301 to S304 are performed by the image processing apparatus 2000.

In the step S301, the image acquisition unit 204a acquires the captured image captured by the imaging apparatus 1000 and the additional information associated with the captured image by wired or wireless communication.

The steps S302 to S303 are similar to the steps S106 to S107. The first embodiment acquires the light amount distribution information on the program based on the information on the model type of the illumination apparatus and the light emitter specified by the additional information. This embodiment acquires the light amount distribution corresponding to the model type of the illumination apparatus and the light emitter by downloading it from the website.

In the step S304, the surface normal information acquisition unit 204d acquires the surface normal information by considering the light amount distribution in solving the expression (1) by the photometric stereo method. The surface normal information and the image information are stored in the image recorder 109, and the flow ends.

As described above, the light-source incident angle and the light amount distribution information can be acquired from the additional information by recording the additional information in the captured image. Thereby, even when surface normal information acquisition processing is executed on the image processing apparatus different from the imaging apparatus, it is possible to lessen the burden of the user in calculating the surface normal information with high accuracy.

The present invention can also be executed by remote imaging that controls an imaging apparatus from a PC, a mobile terminal, or the like. In that case, some or all of the functions of the control apparatus may be executed on the PC or mobile terminal rather than the imaging apparatus. For example, the PC or the mobile terminal can write the additional information, control the emission state, or control the emission mode. It is not always necessary for the imaging apparatus, the PC, and the mobile terminal to control the emission state and the emission mode. For example, a control can be made such as switching the emission mode on the illumination apparatus or sequentially changing the emission state by the control unit on the illumination apparatus whenever a light emission instructing signal such as an imaging signal is received. An imaging signal may be transmitted from the illumination apparatus to the imaging apparatus while the emission state is controlled by the control unit on the illumination apparatus. The control unit which controls the emission state of the illuminating apparatus, and the write unit which writes the additional information may be provided in separate apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a emission memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The above embodiments can provide a control apparatus, an imaging apparatus, an illumination apparatus, an image processing apparatus, an image processing method, and a storage medium, each of which can lessen a burden of a user in obtaining the surface normal information with high accuracy.

This application claims the benefit of Japanese Patent Application Nos. 2019-019645, filed on Feb. 6, 2019 and 2019-237623, filed on Dec. 27, 2019, which are hereby incorporated by reference herein in their entirety.

What is claimed is:

1. A control apparatus comprising a write unit configured to write additional information on an imaging state in acquiring an image captured with at least three light sources located at different positions by correlating the additional information with the image,
    wherein the additional information is information configured to identify at least one of information on an incident angle of light from each light source toward the object on the image and light amount distribution information of the light emitted from each light source on the image, and
    wherein at least one processor or circuit is configured to perform a function of the write unit.

2. The control apparatus according to claim 1, further comprising a control unit configured to control an emission state of the at least three light sources.

3. The control apparatus according to claim 1, wherein the additional information is information configured to identify the incident angle information and the light amount distribution information.

4. The control apparatus according to claim 2, wherein the control unit has a function of switching a plurality of emission modes, and
    wherein the write unit changes the additional information based on the emission mode.

5. The control apparatus according to claim 4, wherein the emission mode includes a programmed emission mode configured to change the emission state in synchronization with each of at least three or more imaging signals.

6. The control apparatus according to claim 5, wherein at least one of the plurality of emission states in the programmed emission mode is to emit none of the light sources.

7. The control apparatus according to claim 5, further comprising a surface normal information acquisition unit configured to acquire surface normal information of the object using a plurality of images acquired in the programmed emission mode.

8. The control apparatus according to claim 5, wherein the additional information includes identification information of an illumination apparatus including the light sources in the programmed emission mode.

9. The control apparatus according to claim 5, wherein the additional information includes position information of the light sources relative to the imaging apparatus in the programmed emission mode.

10. The control apparatus according to claim 5, wherein the additional information includes information configured to identify each emission state of the light source in the programmed emission mode.

11. The control apparatus according to claim 4, wherein the emission mode includes a full emission mode that emits all light sources and a non-emission mode that emits none of the light sources.

12. The control apparatus according to claim 4, wherein the additional information when the image is captured in a predetermined emission state in a first emission mode is different from that when the image is captured in the predetermined emission state in a second emission mode.

13. The control apparatus according to claim 1, wherein the additional information includes at least one of an imaging condition, trimming information, and a sensor size.

14. The control apparatus according to claim 1, further comprising a correction unit configured to correct luminance distributions of images each of which is acquired in different emission states as the image based on the light amount distribution information so as to reduce differences in effects of light amount distributions of the light sources of luminance distributions of images.

15. An illumination apparatus controlled by the control apparatus according to claim 1, the illumination apparatus comprising:
   at least three light sources located at different positions, and
   an identified portion configured to cause the control apparatus to identify information on the illumination apparatus.

16. An imaging apparatus comprising:
   an image sensor configured to capture an object and to acquire an image; and
   the control apparatus according to claim 1.

17. The imaging apparatus according to claim 16, further comprising an illumination apparatus that includes the at least three light sources.

18. An image processing apparatus comprising:
   an image acquisition unit configured to acquire an image;
   an additional information acquisition unit configured to acquire additional information on an imaging state in acquiring the image; and
   a surface normal information acquisition unit configured to acquire surface normal information based on (a) the image, (b) information on an incident angle of light from the light source to the object on the image acquired with the additional information, and (c) light amount distribution information emitted from the light source on the image, acquired with the additional information.

19. An image processing method comprising the steps of:
   acquiring an image;
   acquiring additional information on an imaging state in acquiring the image; and
   acquiring surface normal information based on (a) the image, (b) information on an incident angle of light from the light source to the object on the image, and (c) light amount distribution information emitted from the light source on the image, acquired with the additional information.

20. A non-transitory computer-readable storage medium storing a program that causes a computer to execute the image processing method according to claim 19.

* * * * *